US008507628B2

(12) United States Patent
Musgrave et al.

(10) Patent No.: US 8,507,628 B2
(45) Date of Patent: *Aug. 13, 2013

(54) PROPYLENE BASED POLYMERS FOR INJECTION STRETCH BLOW MOLDING

(75) Inventors: Michael Musgrave, Houston, TX (US); Dang Le, Houston, TX (US); Luyi Sun, Houston, TX (US); David Smith, LaPorte, TX (US)

(73) Assignee: Fina Technology, Inc., Houston, TX (US)

( * ) Notice: Subject to any disclaimer, the term of this patent is extended or adjusted under 35 U.S.C. 154(b) by 928 days.

This patent is subject to a terminal disclaimer.

(21) Appl. No.: 11/906,605

(22) Filed: Oct. 2, 2007

(65) Prior Publication Data

US 2009/0087602 A1 Apr. 2, 2009

(51) Int. Cl.
*C08F 210/06* (2006.01)
*C08F 210/16* (2006.01)

(52) U.S. Cl.
USPC .......... 526/348.1; 425/326.1; 428/35.7; 526/348; 528/396

(58) Field of Classification Search
USPC ........... 526/348, 348.1, 348.2, 348.6, 351, 526/90, 123.1, 124.2, 124.3, 124.4, 124.5, 526/154, 155, 158, 210, 237, 157; 502/103, 502/117, 118, 129, 132, 133
See application file for complete search history.

(56) References Cited

U.S. PATENT DOCUMENTS

| | | | |
|---|---|---|---|
| 4,522,930 A | 6/1985 | Albizzati et al. | |
| 4,904,628 A | 2/1990 | Albizzati et al. | |
| 4,975,403 A * | 12/1990 | Ewen | 502/113 |
| 6,350,828 B1 * | 2/2002 | Takaoka et al. | 526/125.3 |
| 6,733,717 B1 * | 5/2004 | Marczinke et al. | 264/532 |
| 7,005,487 B2 * | 2/2006 | Balbontin et al. | 526/142 |
| 7,074,871 B2 * | 7/2006 | Cecchin et al. | 526/351 |
| 2005/0148720 A1 * | 7/2005 | Li et al. | 524/474 |
| 2006/0105906 A1 * | 5/2006 | Morini et al. | 502/115 |
| 2007/0055027 A1 * | 3/2007 | Thorman | 526/124.2 |
| 2008/0139717 A1 * | 6/2008 | Brasel et al. | 524/380 |
| 2008/0161515 A1 * | 7/2008 | Blackmon et al. | 526/127 |

FOREIGN PATENT DOCUMENTS

| | | |
|---|---|---|
| EP | 0208524 | 1/1987 |
| EP | 0360491 | 3/1990 |
| WO | WO0063261 | 10/2000 |
| WO | WO0157099 | 8/2001 |
| WO | WO0230998 | 4/2002 |
| WO | WO02098837 | 12/2002 |
| WO | WO 2006018813 | * 2/2006 |

OTHER PUBLICATIONS

Basell Press Release.

* cited by examiner

*Primary Examiner* — Richard A Huhn

(57) ABSTRACT

Injection stretch blow molded (ISBM) articles and methods of forming the same are provided herein. In one embodiment, the ISBM articles generally include a propylene based random copolymer having a molecular weight distribution of from about 9 to about 20. In another embodiment, the ISBM articles generally include a propylene based random copolymer formed from a Ziegler-Natta catalyst including a succinate internal donor.

6 Claims, 3 Drawing Sheets

PROPYLENE BASED POLYMERS FOR INJECTION STRETCH BLOW MOLDING

FIELD

Embodiments of the present invention generally relate to polymers adapted for use in injection stretch blow molding. In particular, embodiments of the invention relate to propylene polymers adapted for use in injection stretch blow molding.

BACKGROUND

Historically, polyester terephthalate (PET) has been utilized for injection stretch blow molding performs, which are used to form injection stretch blow molded (ISBM) articles, such as bottles and wide mouth jars, for example. While attempts have been made to utilize polypropylene for the performs, propylene based performs have tended to exhibit a narrow processing window, primarily during the reheat, stretch and blowing steps. In particular, propylene polymers have generally resulted in a narrow temperature window resulting in the inability to ensure defect-free production of containers. While utilization of random copolymers has somewhat increased that window, prior efforts at utilizing random copolymers resulted in polymers that were too stiff for ISBM processes.

Therefore, a need exists to produce a propylene based polymer (including copolymers) capable of use in injection stretch blow molding.

SUMMARY

Embodiments of the present invention include injection stretch blow molded (ISBM) articles. In one embodiment, the ISBM articles generally include a propylene based random copolymer having a molecular weight distribution of from about 9 to about 20. In another embodiment, the ISBM articles generally include a propylene based random copolymer formed from a Ziegler-Natta catalyst including a succinate internal donor.

Embodiments further include methods of forming the ISBM articles. Such methods generally include providing the propylene based random copolymer, injection molding the propylene based random copolymer into a perform and stretch-blowing the perform into a bottle.

DETAILED DESCRIPTION

Introduction and Definitions

Figure 1:
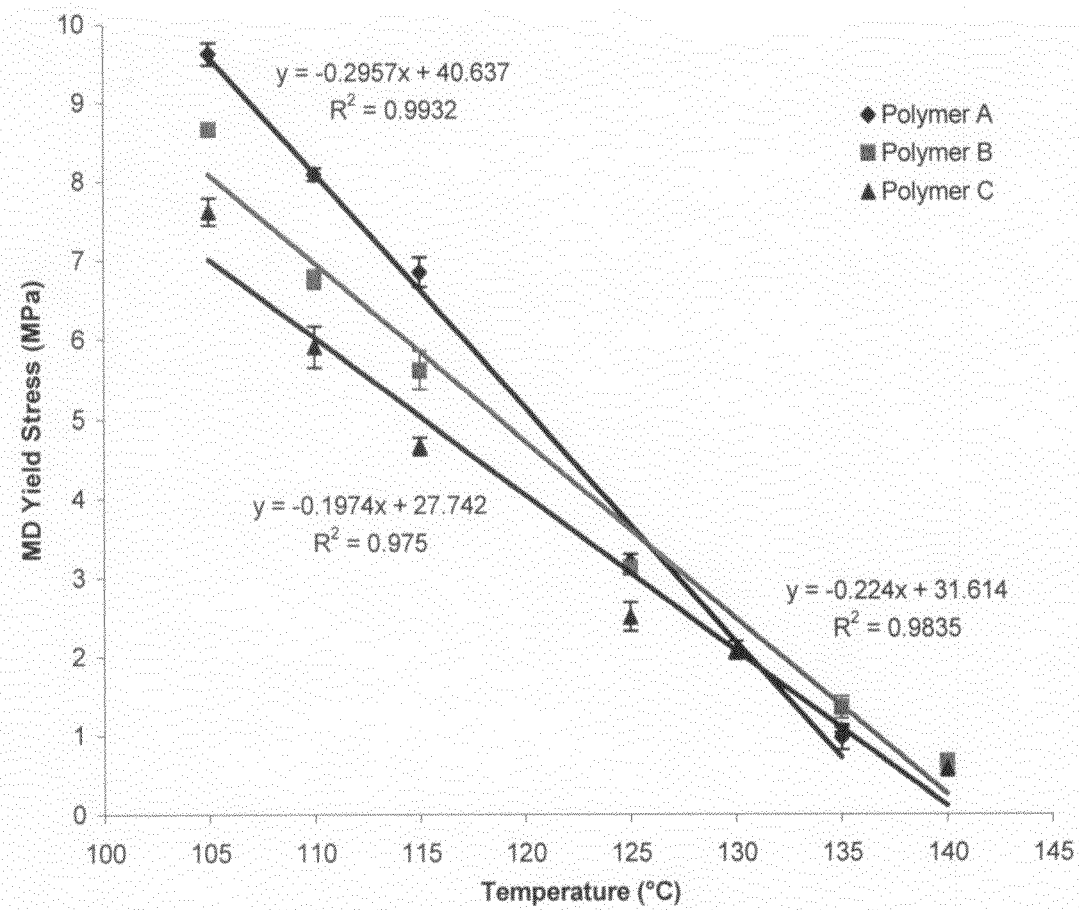
FIG. 1 illustrates the stretching yield stress of polymer samples.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. A brief discussion of such catalyst systems is included below, but is in no way intended to limit the scope of the invention to such catalysts.

Ziegler-Natta catalyst systems are generally formed from the combination of a metal component (e.g., a potentially active catalyst site) with one or more additional components, such as a catalyst support, a cocatalyst and/or one or more electron donors, for example.

A specific example of a Ziegler-Natta catalyst includes a metal component generally represented by the formula:

$$MR_x;$$

wherein M is a transition metal, R is a halogen, an alkoxy, or a hydrocarboxyl group and x is the valence of the transition metal. For example, x may be from 1 to 4.

The transition metal may be selected from Groups IV through VIB (e.g., titanium, chromium or vanadium), for example. R may be selected from chlorine, bromine, carbonate, ester, or an alkoxy group in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with an activator, which is also referred to in some instances as a "cocatalyst". Embodiments of such Z-N activators include organoaluminum compounds, such as trimethyl aluminum (TMA), triethyl aluminum (TEAl) and triisobutyl aluminum (TiBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene soluble material in the polymer. The internal electron donors may include amines, amides, esters, ketones, nitriles, ethers, thioethers, thioesters, aldehydes, alcoholates, salts, organic acids, phosphines, diethers, succinates, phthalates, malonates, maleic acid derivatives, dialkoxybenzenes or combinations thereof, for example. (See, U.S. Pat. No. 5,945,366 and U.S. Pat. No. 6,399,837, which are incorporated by reference herein.)

In one specific, non-limiting embodiment, the electron donor includes a succinate. Specific, non-limiting, examples of succinates include diethyl succinate, dibutyl succinate, diethyl methylsuccinate, dipropylsuccinate, dipentylsuccinate, dihexylsuccinate, dioctylsuccinate, didecylsuccinate, butlyoctylsuccinate, didodecylsuccinate, diethyl sec-butylsuccinate, diethyl thexylsuccinate, diethyl trimethylsilylsuccinate, diethyl cyclohexylsuccinate, diethyl benzylsuccinate, diethyl cyclohexyl(methyl)succinate, diethyl t-butylsuccinate, diethyl isobutylsuccinate, diethyl isopropylsuccinate, diethyl neopentylsuccinate, diethyl isopentylsuccinate, diethyl 2-benzyl-2-isopropylsuccinate, diethyl 2,2-cyclopentylsuccinate, diethyl 2,2-diisobutylsuccinate, diethyl 2-isopropyl-2-methylsuccinate, diethyl 2,2-diisopropylsuccinate, diethyl 2-isobutyl-2-ethylsuccinate, diethyl 2-isopentyl-2-isobutylsuccinate, diethyl 2,2-cyclohexylsuccinate, diethyl 2,3-diisopropylsuccinate, diethyl 2,3-dicyclohexylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2-isopropyl-3-isobutylsuccinate, diethyl 2-t-butyl-3-isopropylsuccinate, diethyl 2-isopropyl-3-cyclohexylsuccinate and diethyl 2-isopentyl-3-cyclohexylsuccinate, for example.

The succinate based catalyst systems generally produce polymers exhibiting a broad molecular weight distribution, discussed in further detail below. Previous attempts to produce ISBM articles with propylene polymers have been unable to recognize the applicability of broad molecular weight distribution polymers as a solution to narrow processing windows and stiffness in the polymer. As used herein, the term "processing window" refers to the sensitivity of a polymer to changes in the heating temperature from a predetermined ideal temperature. For example, the narrower the processing window, the more sensitive to temperature changes a polymer is and vice versa. In fact, previous attempts to utilize propylene based polymers have actually included processes to further lower (narrow) the molecular weight distribution of the polymers utilized. Unexpectedly, embodiments of the invention have been able to produce ISBM articles within acceptable processing windows (e.g., less sensitivity to temperature changes) with few (e.g., less than 10% or less than 5%) of the articles produced having defects. As used herein, "defects" are measured via visual inspection. The visual defects generally result from concentrating (stretching too much or too little) in any region of an article. The defects may further be measured via mechanical properties testing.

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CMDS), diisopropyldimethoxysilane (DIDS) and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Z-N support materials may include a magnesium dihalide, such as magnesium dichloride or magnesium dibromide, or silica, for example.

The Ziegler-Natta catalyst may be formed by any method known to one skilled in the art. For example, the Ziegler-Natta catalyst may be formed by contacting a transition metal halide with a metal alkyl or metal hydride. (See, U.S. Pat. No. 4,298,718, U.S. Pat. No. 4,298,718, U.S. Pat. No. 4,544,717, U.S. Pat. No. 4,767,735, and U.S. Pat. No. 4,544,717, which are incorporated by reference herein.)

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456, 471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

The additives may include additives known to one skilled in the art. For example, non-limiting additives may include anti-oxidants, such as sterically hindered phenols, stabilizers, such as phosphates, neutralizers, such as stearates, lubricants, mold-release agents, fillers, such as talc and chalk, antistatic agents, plasticizers, dyes, pigments, flame retardants, nucleating agents, such as talc, silica, kaolin, sodium benzoate and sodium 2,2'-methylenebis(4,6-di-tert-butylphenyl)phosphate or combinations thereof, for example.

Polymer Product

The polymers (and blends thereof) formed via the processes described herein may include propylene based random copolymers. Unless otherwise specified, the term "propylene based" refers to polymers whose primary component is propylene (e.g., at least about 50 wt. %, or at least about 75 wt. %, or at about least 80 wt. % or at least about 89 wt. %). The term "propylene based random copolymer" refer to those copolymers composed primarily of propylene and an amount of other comonomers, such as ethylene, wherein the comonomer make up at least about 0.2 wt. %, or at least about 0.8 wt. % or at least about 2 wt. % by weight of polymer. Further, the term "random copolymer" refers to a copolymer formed of macromolecules in which the probability of finding a given monomeric unit at any given site in the chain is independent of the nature of the adjacent units.

In one embodiment, the polymers include propylene based random copolymers. The comonomer may be selected from $C_2$ to $C_{10}$ alkenes. For example, the comonomer may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. In such an embodiment, the ethylene may be present in an amount of from about 0.2 wt. % to about 10 wt. % or from about 0.6 wt. % to about 4 wt. %, for example.

Unless otherwise designated herein, all testing methods are the current methods at the time of filing.

While conventional Ziegler-Natta formed polypropylene generally exhibits a molecular weight distribution of from about 5 to about 7, for example, prior attempts to utilize polypropylene for use in ISBM have included further lowering the molecular weight distribution of the polymers used via processes, such as peroxide degradation, in order to shorten cycle times, for example. Unfortunately, such processes have resulted in impaired mechanical properties. However, the propylene based random copolymers utilized herein generally exhibit a broad molecular weight distribution (Mw/Mn), as measured by GPC. For example, the propylene based random copolymers generally exhibit a molecular weight distribution of at least 9, or at least 10 or at least 11, for example. In one embodiment, the propylene based random copolymers exhibit a molecular weight distribution of from about 10 to about 20, or from about 10 to about 18 or from about 10 to about 15, for example.

The propylene based random copolymers may exhibit a melt flow rate of at least about 2 dg./10 min., or from about 5 dg./10 min. to about 30 dg./10 min. or from about 10 dg./10 min. to about 20 dg./10 min., for example, as measured by ASTM D1238.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

In one embodiment, the polymers are used in injection stretch blow molding (ISBM). ISBM may be used to produce thin-walled, high-clarity bottles. Such processes are generally known to one skilled in the art. For example, ISBM processes may include injecting the polymer into a perform and subsequently stretch-blowing the perform into a bottle.

As described previously herein, embodiments of the invention generally result in the ability to form ISBM articles with broader processing windows than conventional Ziegler-Natta polymers experience. For example, embodiments of the invention may result in a processing window of from about 115° C. to about 140° C. (deviation from predetermined ideal temperature).

Unexpectedly, the embodiments described herein result in a cost-effective and successful alternative to PET for use in ISBM processes.

EXAMPLES

Injection stretch blow molded (ISBM) articles were formed from a variety of polymers. As used herein, Polymer "A" refers to a random copolymer formed by a conventional Ziegler-Natta catalyst (commercially available as 7525MZ, from TOTAL Petrochemicals USA, Inc.), including 3.1 wt. % $C_2$ (analyzed via NMR), a molecular weight distribution of 6.4 and having a melt flow rate of 11 g/10 min. Polymer "A" further includes 500 ppm of IRGANOX® 1010, 1000 ppm of IRGANOX® 168, 1000 ppm of calcium stearate, 250 ppm of DHT-4A and 500 ppm of ATMER® 129. Polymer "B" refers to a random copolymer formed by a succinate based Ziegler-Natta catalyst, including 3.2 wt. % $C_2$ (analyzed via NMR), a molecular weight distribution of 10 and having a melt flow rate of 15 g/10 min. Polymer "B" further includes 500 ppm of IRGANOX® 1010, 1000 ppm of IRGANOX® 168, 1000 ppm of calcium stearate, 250 ppm of DHT-4A and 500 ppm of ATMER® 129. Polymer "C" refers to a random copolymer formed by a succinate based Ziegler-Natta catalyst, including 3.3 wt. % $C_2$ (analyzed via NMR), a molecular weight distribution of 10 and having a melt flow rate of 14 g/10 min. Polymer "C" further includes 560 ppm of IRGANOX® 1010, 1090 ppm of IRGANOX® 168, 1010 ppm of calcium stearate, 260 ppm of DHT-4A and 10400 ppm of ATMER® 129.

The polymer samples were cast into 16 mil sheets and then stretched bi-axially from 105° C. up to stretching failure temperatures on a Bruckner stretching machine. The results are illustrated in FIG. 1 (observe that the liner fit lines of B and C have lower slope than that of A). It was observed that Polymers B and C are less affected by temperature, and indicating a broader processing window for subsequent ISBM processes, than Polymer A.

Each of the polymer samples was molded into 21 g bottle performs. A table of polymer and the corresponding perform properties follow in Table 1.

TABLE 1

| Sample | $T_c$(° C.) | $\Delta H_c$(J/g) | $T_m$(° C.) | $\Delta H_m$(J/g) |
|---|---|---|---|---|
| Polymer | | | | |
| A | 117.1 | 81.2 | 150.2 | 99.47 |
| B | 122.3 | 83.12 | 153.9 | 102.93 |
| C | 121.7 | 76.61 | 154.1 | 89.66 |
| Preform | | | | |
| A | 116.9 | 81.81 | 149.3 | 96.38 |
| B | 121.8 | 81.3 | 154.0 | 94.72 |
| C | 120.7 | 75.93 | 153.7 | 89.89 |

The close results observed between the performs and polymers indicate that the injection molding process does not considerably change the polymer morphology.

Each of the performs were aged for at least 24 hours and then blown into bottles using a linear injection stretch blow molder (line speed of 1000 bottles/hour/cavity).

Figure 2:
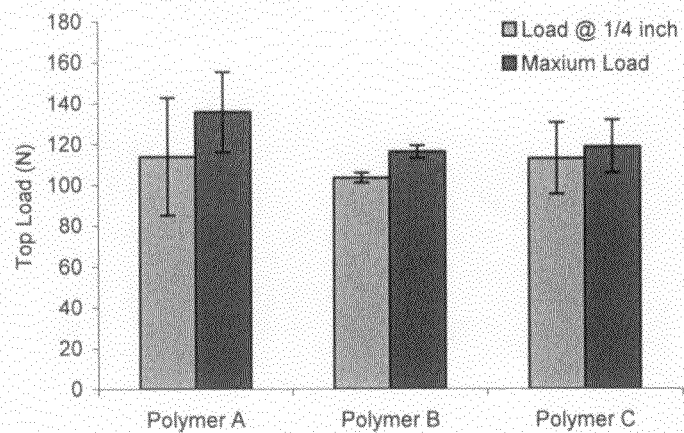
FIG. 2 illustrates the top load strength of formed samples.
Figure 3:
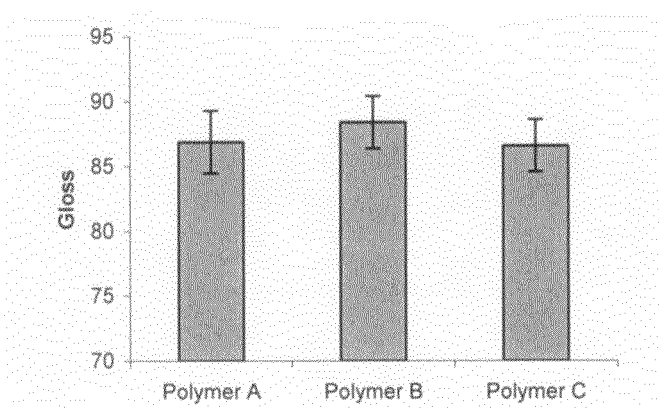
FIG. 3 illustrates the gloss of formed samples.
Figure 4:
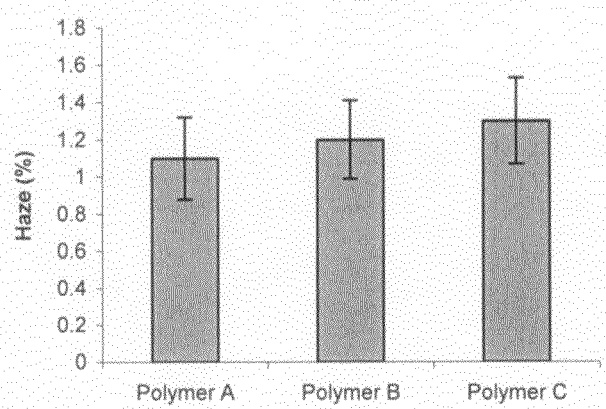
FIG. 4 illustrates the haze of formed samples.

It was observed that while all bottles were able to sustain quarter inch deflection, the bottles formed from Polymer A experienced slightly better top load properties than those formed from Polymers B and C. See, FIG. 2. All of the bottles experienced similar gloss and haze properties. See, FIGS. 3 and 4.

However, it was observed that Polymer A resulted in more bottle defects than Polymers B and C. In particular, it was observed that Polymer C resulted in 1 base area bottle defect, Polymer B resulted in 1 shoulder area bottle defect and 1 base area bottle defect while Polymer A resulted in 21 shoulder area bottle defects and 2 base area bottle defects per 40 articles produced.

Figure 5:
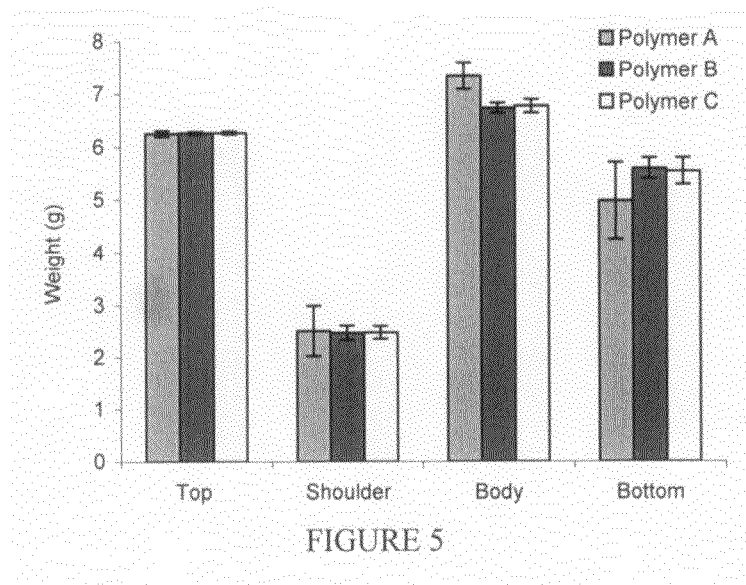
FIG. 5 illustrates the weight distribution of formed samples.

An analysis of the specific bottle segment weights show that the Polymer A sample had a significantly larger standard deviation for the weight of different bottle sections than the Polymers B and C samples, particularly in the shoulder and bottom areas. See, FIG. 5.

The bottles were further tested for drop impact. The measurement included filling the bottles with water, conditioning the bottles for 24 hours at 20° C. and the drop testing the bottles from various heights in 2 different orientations. While no difference in drop impact performance was observed from a height of 4 ft., 3 out of 24 bottles formed from Polymer A cracked, 1 out of 24 bottles formed from Polymer B cracked and no bottles formed from Polymer C cracked at a height of 6 ft.

While the foregoing is directed to embodiments of the present invention, other and further embodiments of the invention may be devised without departing from the basic scope thereof and the scope thereof is determined by the claims that follow.

What is claimed is:

1. A method of forming an injection stretch blow molded article formed of a single polymer, comprising:
    providing the single polymer, wherein the single polymer is a propylene based random copolymer comprising a molecular weight distribution of from about 9 to about 20 and the single polymer is formed in single loop reactor;
    injection molding the propylene based random copolymer into a preform; and
    stretch-blowing the preform into an article.

2. The method of claim 1, wherein the random copolymer comprises ethylene.

3. The method of claim 1, wherein the random copolymer comprises from about 0.2 wt. % to about 10 wt. % ethylene.

4. The method of claim 1, wherein the random copolymer comprises at least about 89 wt. % propylene.

5. The method of claim 1, wherein the propylene based random copolymer is formed from a Ziegler-Natta catalyst.

6. The method of claim 5, wherein the Ziegler-Natta catalyst comprises a succinate electron donor.

* * * * *